United States Patent [19]

Thorpe et al.

[11] Patent Number: 4,604,436

[45] Date of Patent: Aug. 5, 1986

[54] PROCESS FOR METAL MODIFIED PHENOLIC NOVOLAC RESIN

[75] Inventors: Donald H. Thorpe, Williamsville; Raymond P. Knipple, North Tonawanda, both of N.Y.

[73] Assignee: Occidental Chemical Corporation, Niagara Falls, N.Y.

[21] Appl. No.: 132,739

[22] Filed: Mar. 24, 1980

Related U.S. Application Data

[63] Continuation-in-part of Ser. No. 47,836, Jun. 12, 1979, abandoned.

[51] Int. Cl.$^4$ .................. C08G 8/32; C08G 8/36; C08L 61/14
[52] U.S. Cl. ..................... 525/504; 346/210; 346/211; 346/212; 428/531; 525/506; 528/148; 528/153; 528/161
[58] Field of Search ............... 525/504, 506; 528/161, 528/148, 153; 428/531; 260/29.3; 346/210, 211, 212

[56] References Cited

U.S. PATENT DOCUMENTS

| | | | |
|---|---|---|---|
| 3,737,410 | 6/1973 | Mueller | 260/29.3 X |
| 3,817,922 | 6/1974 | Barth | 525/504 |
| 4,025,490 | 5/1977 | Weaver | 528/161 X |
| 4,165,102 | 8/1979 | Bodmer | 525/504 X |
| 4,165,103 | 8/1979 | Bodmer | 525/504 X |
| 4,173,684 | 11/1979 | Stolfo | 428/531 |
| 4,216,299 | 8/1980 | Kikuga et al. | 525/505 X |
| 4,216,300 | 8/1980 | Kikuga et al. | 525/505 X |
| 4,226,962 | 10/1980 | Stolfo | 528/155 X |

*Primary Examiner*—Howard E. Schain
*Attorney, Agent, or Firm*—James F. Tao; James F. Mudd

[57] ABSTRACT

A complex coordination compound of a novolac phenolic resin with zinc, copper, cobalt, cadmium, aluminum, indium, tin, chromium, cobalt or nickel is prepared by reaction of an oxide of the metal or an inorganic functional equivalent of the oxide, an alkanoic or aromatic monocarboxylic acid and an ammonia base. The resin product is useful as a color developer for coating of the record sheet of a chemical carbonless copying sheet system.

43 Claims, No Drawings

PROCESS FOR METAL MODIFIED PHENOLIC NOVOLAC RESIN

REFERENCE TO PRIOR APPLICATION

This application is a continuation-in-part of the copending U.S. Application ser. No. 47,836, now abandoned of D. H. Thorpe and R. P. Knipple, filed June 12, 1979.

BACKGROUND OF THE INVENTION

This invention relates to metal-modified phenol-aldehyde novolac resins, and more particularly to an improved method for producing them. Such metal-modified novolacs are useful as developing agents for basic colorless chromogenic dye precursors such as Crystal Violet lactone. Color producing systems of this type are useful in manifolding systems (so called pressure sensitive copy paper systems or chemical carbonless copy sheet units) wherein a color-developer, a color precursor and a common liquid solvent for each are maintained in isolation on a surface of a sheeting material carrier such as paper, or in isolation on separate surfaces of a carrier. The color developer may advantageously be applied as a coating to the record sheet, either alone or admixed with mineral particles. Conveniently, the color precursor and the solvent may be encapsulated in microcapsules of the type described in U.S. Pat. No. 2,800,457 (the disclosure of which patent is incorporated herein by reference), and said microcapsules together with a binder applied as a coating to a sheet, i.e. the transfer or coated back (CB) sheet. In this instance, the color developer is coated on a separate sheet usually of paper, i.e. the color receiving or coated front (CF) sheet. When the two sheets are superimposed with their respective coatings in contact and subjected to localized pressure as by a typewriter key, the walls of the microcapsules in the area subjected to pressure are ruptured, and a solution of the color precursor and the solvent originally contained in the ruptured capsules is transferred in a marking pattern to the sheet surface carrying the color developer. Almost instantaneously a colored mark is formed on the surface carrying the color developer. Alternately, the microcapsules and color developer may be intermixed on the same surface of a substrate sheet. If desired, the microcapsules may contain a solvent solution of the color developer, in which event the color precursor is either applied as a coating to the second substrate sheet or is intermixed with the microcapsules on the same substrate surface.

The use of compounds of the novolac resin and a metal as a means of improving the color forming reactions of the novolac resin with the basic colorless, chromogenic dye precursors is known.

According to H. J. Mueller, U.S. Pat. No. 3,737,410, issued June 5, 1973 (assigned to National Cash Register Company) it is known to prepare zinc modified novolac resins by heating in the melt, zinc dibenzoate and the novolac resin in the presence of either a strong base or a weak base such as zinc hydroxide, ammonium carbonate and ammonium bicarbonate.

Also according to F. D. Weaver, U.S. Pat. No. 4,025,490, issued May 24, 1977 (assigned to The Mead Corporation) a novolac resin modified with zinc, copper, cadmium, aluminum, indium, tin, chromium, cobalt or nickel is prepared by melting the novolac resin together with a metal salt of an alkane carboxylic acid in the presence of gaseous ammonia, ammonium hydroxide, or ammonium compound such as ammonium carbonate or bicarbonate to surpress formation of metal oxide. According to the Weaver patent any metal oxide formed in the process prevents that portion of the metal from entering into the modification of the novolac resin and is wasted. It is indicated by Col. 2, lines 44–46 of the Weaver patent that ammonium moieties are incorporated in the metal modified resin.

It has been found according to the present invention that the metal-modified novolac resin compounds prepared in the presence of an ammonia base according to the aforementioned U.S. patents of Weaver and Mueller are complex coordination compounds. Although the exact structure of these compounds is unknown, the compounds contain carboxylate moieties (e.g. alkanoate or benzoate residues) ammonia (i.e. $NH_3$) or ammonium ($NH_4^+$) moieties as well as the metal in complex coordination with the novolac resin.

The preparatory procedures disclosed by the aforementioned Mueller and Weaver patents require charging as reactants metal salts of carboxylic acids (i.e. a metal salt of an alkanoic acid is required as reactant by Weaver while a metal salt of an aromatic monocarboxylic acid is required by Mueller). It is well known that such metal carboxylic acid salts are costly to prepare, isolate and purify. Accordingly, a process for preparing the present compounds which avoids charging as a reactant such costly carboxylic acid salts would be highly desirable to minimize the cost of production of these metal-ammonia-carboxylate-novolac compounds.

It is the object of this invention to devise an improved process for preparing metal-modified novolac phenolic resins suitable for use as color developer coatings in pressure sensitive copy paper systems which does not require charging as reactant a carboxylate salt of the metal.

SUMMARY OF THE INVENTION

The foregoing object is achieved in an improvement according to the invention in the process of preparing a metal-modified novolac phenolic resin wherein the metal is selected from the group consisting of copper, aluminum, zinc, chromium, indium, tin, cadmium, cobalt, and nickel by reaction of a compound of said metal, an ammonia base and a novolac phenolic resin at an elevated temperature sufficient to maintain the reaction mixture in molten condition. This improvement comprises charging as reactants an oxide of the metal or functional equivalent of said oxide, a monocarboxylic acid selected from the group consisting of $C_{1-12}$ alkanoic acids and aromatic carboxylic acids of the benzene and naphthalene series. The invention also includes the metal-modified novolac resin product of the process of the invention, color-receiving, i.e. CF sheets, sheets coated with said metal-modified novolac resin, the dispersions employed to coat sheeting material to prepare such CF sheets, and the chemical carbonless copy system employing such CF sheets in combination with coated back, i.e. CB, sheets.

The present process provides metal moidified novolac resin products which on the basis of their properties are suitable for use as color developers for coating the record sheet or carrier in pressure-sensitive carbonless copy paper systems. The aforementioned properties of the present products, e.g. degree of color development and fade resistance of the developed color, of the present product are at least about equal to those of comparable metal-modified novolac resins prepared by conventional techniques, for example by the procedures of the aforementioned Mueller and Weaver U.S. patents.

The proportion of metal which is incorporated by chelation, i.e. coordination, into the metal-modified product of the present process (computed as weight percent of metal oxide based on weight of metal oxide charged) is generally at least about 60% and usually is about 90% or more. This result is unexpected in view of the above-discussed disclosure of the Weaver patent which indicates that the presence of metal oxide in the reaction mixture of the preparation of the metal-containing novolac resin is detrimental to the introduction of the metal into the metal-modified novolac resin product.

DETAILED DESCRIPTION OF THE INVENTION AND PREFERRED EMBODIMENTS THEREOF

The Novolac Phenol-Aldehyde Resin

The present novolac resins employed as the reactant in the present process are well-known in the art and are prepared by condensation of a molar proportion of a phenol with more than one molar proportion of an aldehyde, e.g. acetaldehyde or preferably formaldehyde, or an aldehyde source which generates the aldehyde under the conditions of the condensation reaction, e.g. paraldehyde or preferably formalin. The condensation is generally effected in the presence of a basic or preferably acidic catalyst, e.g. oxalic acid, hydrochloric acid, sulfuric acid, or sulfamic acid. After completion of the condensation reaction, i.e. reaction of substantially all of the aldehyde, with the phenol, water is removed from the reaction mass, i.e. the reaction mass is dehydrated by gradually raising the temperature of the reaction mixture from a temperature corresponding to the reflux temperature, i.e. about 100° C. of the reaction mass to about 140° to about 180° C. generally under subatmospheric pressure.

In accordance with known phenolic resin technology, the phenolic reactant employed in the preparation of the novolac resins may be either a tri- or a higher-functional phenol (i.e. a phenol in which at least three positions of the benzene ring in the phenol are available for condensation in the condensation polymerization reaction employed to prepare the phenolic novolac resin), a para-substituted phenol difunctional phenol (i.e. a phenol which contains a substituent in the para position and in which the two ortho positions of the benzene ring of the phenol are available for the condensation polymerization reaction with the aldehyde) or desirably a mixture of the aforementioned tri- or higher-functional phenol and p-substituted difunctional phenol.

Illustrative examples of the aforementioned tri- or higher functional phenols include phenol itself, metacresol, 1,3,5-xylenol bisphenol A, alpha- or beta-naphthol, catechol and the like. A tri-functional phenol, especially phenol, is preferred.

Illustrative examples of the aforementioned p-substituted di-functional phenols include p-cresol, p-ethyl phenol, p-propyl phenol, p-sec. butyl-phenol, p-tert. butyl-phenol, p-dodecyl-phenol, p-chloro-phenol, p-bromo phenol, p-phenyl-phenol, p-cumyl-phenol, p-phenol sulfonic acid, p-hydroxy-benzoic acid and its alkyl carboxylic acid esters. Preferably the p-substituted difunctional phenol is p-tert. octyl-phenol, p-tert. butyl phenol, p-phenyl-phenol or mixture thereof.

In accordance with the present invention it is preferred to employ a mixture of the aforementioned tri-functional phenol and p-substituted difunctional phenol. Especially preferred is a mixture containing about 80% to about 100% by weight (based on the weight of the mixture) of the p-substituted difunctional phenol and about 0% to about 20% by weight of the tri-functional phenol.

The preparation of novolac phenolic resins including catalysts and reaction conditions of condensation and dehydration steps is presented in Chapters 2 and 3 of D. F. Gould "Phenolic Resins", Rheinhold Publishing Corp., 1959, the disclosure of which is incorporated herein by reference.

The Metal Oxide Reactant

As the metal oxide charged in accordance with the present process, any inorganic oxide of copper, aluminum, zinc, chromium, indium, tin, cadmium, cobalt and nickel can be employed including (as a less preferred embodiment of the invention) the hydrates of said metal oxide. Representative examples of suitable oxides include the following:

| | |
|---|---|
| copper: | $Cu_2O$; $CuO$ |
| aluminum: | $Al_2O_3.2H_2O$; $Al_2O_3.3H_2O$ |
| zinc: | $ZnO$; the mineral zincite |
| cadmium: | $CdO$; $Cd_2O$ |
| chromium: | $Cr_2O_3$; $Cr_2O_3.H_2O$; $CrO$; $CrO_3$; $CrO_2$ |
| indium: | $In_2O_3$; $In_3O_4$; $InO$ |
| tin: | $SnO$; $SnO_2$ |
| cobalt: | $CoO$; $Co_2O_3$ |
| nickel: | $NiO$; $Ni_2O_3$; $Ni_3O_4$; $Ni_3O_4.2H_2O$ |

Mixtures of these metal oxides can be employed also.

In place of the metal oxide or hydrate thereof, according to a less preferred embodiment of the invention, there may be employed a functional equivalent of the metal oxide. By functional equivalent is meant any inorganic compound of any of the aforementioned metals, e.g. a hydroxide or a carbonate of the metal, which is known to form the corresponding metal oxide on heating at the elevated temperature employed in the present process (as discussed more particularly below). For example, $Zn(OH)_2$ or $ZnCO_3$ which are known to form $ZnO$ on heating at a temperature corresponding to that employed in the present process can be charged in the present process as the functional equivalent of a zinc oxide reactant. Hereafter reference to "metal oxide" in this specification shall mean "metal oxide or its functional equivalent".

In the practice of the present invention it is much preferred to employ a metal oxide wherein the metal is in the positive oxidation of two. The metal oxide is especially a dipositive zinc compound, particularly zinc oxide, i.e. $ZnO$.

The Monocarboxylic Acid Reactant

The acid reactant employed in the present invention is a monocarboxylic acid reactant selected from the group consisting of alkanoic acids of 1 to 12 carbon atoms or an aromatic carboxylic acid of the benzene or naphthalene series. The alkyl group of the alkanoic acid and the phenyl or naphthyl substituent of the aromatic acid may contain substituents other than hydrogen, for example halogen, e.g. chlorine, bromine or fluorine, or lower alkyl (i.e. an alkyl substituent of 1 to 8 carbon atoms) aryl, e.g. phenyl or naphthyl, alkaryl, e.g. p-tolyl, or aralkyl, e.g. benzyl.

The alkanoic acids employed may contain a cyclic, straight chain or branched chain alkyl group which is desirably saturated, i.e. devoid of ethylenic or acetylenic unsaturation. A straight or branched chain acylic lower alkanoic acid which is entirely aliphatic in nature is preferred on the basis of ready availability and low cost. For a similar reason aromatic hydrocarbon monocarboxylic acids of the benzene series are preferred. The alkanoic acid reactant employed in the invention advantageously is a hydrocarbon acid, i.e. an alkanoic acid containing only hydrogen substituents.

Advantageously to achieve a satisfactory percent incorporation of metal in the novolac resin in accordance with the invention the monocarboxylic acid reactant employed is an acid melting below about 200° C. (including acids which are liquids at ambient temperature). However, use of an acid which melts (or decomposes without melting) at temperatures of about 200° C. or higher, for example, in the temperature range of about 200° C. to about 400° C. or higher are effective in achieving excellent metal incorporation results according to the invention when employed in admixture with one or more of the above described low melting monocarboxylic acids. In the aforementioned mixtures of low melting monocarboxylic acid with high melting monocarboxylic acid, the low melting acid is conveniently present in the acid mixture in a proportion ranging from about 1 to about 99, preferably about 10 to about 90 mole percent (based on total moles of acids in the mixture of acids). Especially preferred are mixtures of the low melting and high melting monocarboxylic acids in which the proportion of low melting acid in the mixture ranges from about 70 to about 90 mole percent (and correspondingly the proportion of high melting acid in the mixture ranges from about 10 to about 30 mole percent).

Typical low melting monocarboxylic acids suitable for use as reactants in the present invention include the following representative examples of monocarboxylic acids which melt below about 200° C.:

formic acid
acetic acid
propionic acid
2,2' dimethyl propionic acid
butyric acid
valeric acid
caproic acid
caprylic acid
cyclooctanoic acid
cyclohexanoic acid
2-ethyl hexanoic acid
pelargonic acid
lauric acid
o-bromobenzoic acid
m-bromobenzoic acid
2-biphenyl carboxylic acid, i.e. o-phenyl benzoic acid
3-biphenyl carboxylic acid
decanoic acid
3-chloro-propionic acid
phenylacetic acid
benzoic acid
o, m and p-toluic acid
p-ethylbenzoic acid
2,3-dichloro-benzoic acid
2,5-dichloro-benzoic acid
2,4-dichloro-benzoic acid
3,5-dichloro-benzoic acid
p-benzyl benzoic acid
1-naphthoic acid
2-naphthoic acid
2,4-dimethyl benzoic acid
p-tert. butyl benzoic acid
p-n-octyl benzoic acid
hydroxyacetic acid
methoxyacetic acid
2-mercaptophenyl acetic acid
mercapto acetic acid
salicylic acid, i.e. o-hydroxy benzoic acid
(as well as mixtures of these and equivalent acids).

Typical of the aforementioned high melting monocarboxylic acids are the following representative examples of acids of melting points in the range of about 200° C. to about 400° C. or higher.

p-bromo-benzoic acid
p-chlorobenzoic acid
4-biphenyl carboxylic acid
m-hydroxybenzoic acid
p-hydroxybenzoic acid
3,5-dichloro-2-hydroxybenzoic acid
3,4-dichloro-benzoic acid
2,4,6-tribromophenoxyacetic acid
(as well as mixtures of these and equivalent acids)

Preferred acids for use in the invention are salicylic acid, propionic acid and benzoic acid. Benzoic acid provides an especially good result.

The Ammonia Base

Suitable ammonia bases for use in the invention include ammonia and other basic ammonia or ammonium compounds in which the ammonia nitrogen atom is covalently substituted entirely with inorganic substituents. Such ammonia bases which are designated inorganically-substituted ammonia bases for brevity, include in addition to ammonia, ammonium carbonate and ammonium bicarbonate.

Ammonia as employed in the invention can be gaseous ammonia or aqueous ammonia (i.e. ammonium hydroxide). It is, however, preferred to use an ammonia base which is substantially anhydrous. Use of ammonia or aqueous ammonia as the ammonia base may be especially desirable where it is desired to avoid foaming of the reaction mixture on addition of the ammonia base (as occurs through evolution of carbon dioxide gas when ammonium carbonate or bicarbonate is charged as the ammonia base).

The latter inorganically-substituted ammonia bases are preferred as ammonia bases in the practice of the invention. Especially preferred are anhydrous ammonia, ammonium carbonate and ammonium bicarbonate.

Alternatively, if desired, basic compounds of ammonia wherein the nitrogen atom of the ammonia moiety is covalently substituted with one or more, organic radicals, (i.e. wherein there is at least one covalent bond between said nitrogen atom and a carbon atom) can be employed as the ammonia base in the practice of the invention. Such ammonia bases, which are designated organically-substituted ammonia bases, include organic amines and ureas. Preferably employed are organic amines containing a primary or secondary amino group. Especially preferred are aliphatic amines, especially saturated amines including amines containing straight-chain branched chain or cyclic carbon skeltons and the substituted derivatives thereof. The organically-substituted ammonia bases may be further substituted in the hydrocarbon skelton with one or more halogen atoms (such as chlorine, bromine or fluorine); ether substituents such as lower alkoxy groups; hydroxy groups; aromatic groups such as phenyl and naphthyl; and aralkyl groups such as benzyl, 2-phenyl ethyl, and the like.

The amines employed in the invention may contain one or more amino group per molecule, for example the amine may be a diamino-compound.

In general amino compounds employed as organically-substituted ammonia bases according to the invention may contain from one to 20 carbon atoms, but lower aliphatic amines are preferred. Conveniently hydrocarbon amines are employed in the practice of the invention.

Typical representative examples of suitable organically-substituted ammonia bases include
cyclohexyl amine
stearyl amine
morpholine
methyl amine
ethylmethyl amine
ethylamine
mono-isopropyl amine
di-sec.-butyl amine
di-t-butyl amine
$CH_3(CH_2)_{19}NH_2$
n-hexyl amine
n-octyl amine
benzylamine
2-methoxy ethylamine
3-fluoropropylamine
4-chlorobutylamine
3-phenyl propylamine
3-(2-dichlorophenyl)propylamine
2-naphthyl ethylamine
diethanolamine
and the additional oganically-substituted ammonia bases illustrated in Examples 26–33 hereinbelow.

Mixtures of the foregoing inorganically- and organically-substituted ammonia bases can also be used.

Proportions Of The Reactants

In general the metal oxide is charged in a proportion which provides about 0.01 n to about n or more, gram atoms of the metal per 100 parts by weight of the phenolic novolac resin employed (where n is an integer denoting the positive oxidation state of the metal in the metal oxide). Charging metal oxide in excess, e.g. charging metal oxide in a proportion which provides more than n gram atoms of the metal per 100 parts by weight of the resin, is effective in carrying out the process, but may be wasteful of the metal oxide reagent. Preferably, the metal oxide is charged in a proportion which provides about 0.02 n to about 0.5 n gram atoms of the metal per 100 parts by weight of the resin used.

The proportion of the acid which is charged according to the invention is in general about 0.1 to about 3 moles or more per gram-atom of the metal charged in the metal oxide. Preferably about 0.2 to about 2.5 moles of the acid reactant is charged per gram-atom of the metal which is employed.

To prepare the present metal-modified novolac resin products the ammonia base is charged in a proportion corresponding to addition of about 0.5 to about 3 or more equivalents of ammonia (i.e. $NH_3$) per mole of the acid which is charged. Preferably the ammonia base is charged in a proportion which corresponds to about 1.0 to about 1.5 equivalents of $NH_3$ per mole of the acid employed.

DETAILED DESCRIPTION OF THE PROCESS OF THE INVENTION

The improved process of preparing the metal-modified phenolic novolac resins is in general carried out by heating the mixture of the resin, the acid and metal oxide at an elevated temperature sufficient to maintain the reaction mixture in molten condition. The latter elevated temperature ranges from about 90° to about 220° C. and preferably is about 90° to about 180° C. In carrying out the present metal modification reaction it is preferred to add the ammonia base gradually to the molten reaction mixture containing the resin, the acid and the metal oxide so as to avoid loss by volatization of the ammonia base when gaseous ammonia is employed as said base or to avoid excessive foaming of the reaction mass when ammonium carbonate or bicarbonate (which evolve carbon dioxide on addition to the reaction mass) are employed as the ammonia base.

While often the present metal modification reaction is complete within about a minute after contact of the ammonia base with the mixture of the other reactants, it is generally advantageous to maintain the mixture of resin, ammonia base, acid and metal oxide at the elevated reaction temperature for an additional period of from 10 minutes to about 3 hours especially for a period of about 30 minutes to 1.5 hours. Advantageously the present reaction is carried out with agitation of the reaction mixture under a blanket of inert gas such as substantially anhydrous nitrogen or helium.

The preferred reaction temperature of the present invention corresponds to about the temperature employed in the dehydration of a phenolic novolac resin condensate (as described hereinabove). Accordingly, it is preferred to carry out the present metal modification reaction of the resin in conjunction with preparation of the resin by the aforementioned reaction sequence of condensation of aldehyde and phenol reactants followed by dehydration of the resulting condensation mass. According to the latter preferred process embodiment, the hot freshly prepared resin is admixed with the ammonia base, acid and metal oxide subsequent to completion of the condensation reaction so as to react the metal into the resin prior to, during or subsequent to the dehydration reaction.

When the acid reactant of the present process is formic acid, it is especially preferred to admix the acid, ammonia base or the metal oxide with the resin prior to resin dehydration so that the metal modification reaction can be completed at a relatively low temperature, e.g. about 90° to about 110°. This preferred process embodiment avoids a loss of formic acid from the reaction mass which, as we have discovered, occurs when the reaction mass containing the formic acid reactant is heated at a reaction temperature above about 110°. This loss of formic acid generally results in incorporation of only a low, unsatisfactory proportion of metal into the product (for example, incorporation of only about 16% by weight of metal computed as metal oxide, based on metal oxide charged).

When a $C_{2-12}$ alkanoic acid or an aromatic acid is employed as the acid reactant, the present metal modification reaction is carried out in conjunction with the preparation of the resin by preferably admixing said acid, the metal oxide and the ammonia base with the resin during or subsequent to, the dehydration stage of the resin preparation reaction so that the metal is incorporated into the resin at a reaction temperature of above about 130° C., especially at a temperature of about 140° to about 170° C.

THE PRODUCTS OF THE INVENTION

The metal modified resin products of the invention are compounds comprising in complex coordination, the resin, the metal, an ammonia or ammonium residue, and the carboxylate residue of the alkanoic or aromatic carboxylic acid. The exact structural or exact empirical formula of the products is not known. When coated as color developer resin on the record sheet of a copy paper system according to conventional techniques, the present metal-modified resins exhibit beneficial properties for example, an excellent degree of color development and an excellent degree of fade resistance of the developed color, at least about equal to the corresponding properties of comparable metal-modified novolac phenolic resins prepared by conventional reaction techniques for metal-modification of the novolac resin.

The coating of the present metal-containing novolac resin color developer agent on a record or CF sheet can be accomplished according to techniques which are essentially conventional in the chemical carbonless copy sheet art.

Thus, following conventional practice in preparing record or CF sheets, the color developer agent of the invention is coated on the substrate sheet as an emulsion or dispersion in a polar relatively volatile liquid medium such as water. The coating emulsion comprises about 30 to 60 weight percent of the liquid medium about 40 to about 60 weight percent of the color developer agent, about 0.1 to about 1.0 weight percent of an inorganic surfactant such as sodium tripolyphosphate, about 4 to about 15 weight percent of a thickening agent such as starch, about 3 to about 10 weight percent of a binder typically a styrene-butadiene copolymer (which is generally available commerically as a 50% solids content latex), and about 0.1 to about 0.5 weight percent of an organic surfactant, such as the sodium salt of a polymeric carboxylic acid of the type readily available as a 25% aqueous solution sold under the designation Tamol 731 by the Rohm and Haas Co.

Optionally the metal modified novolac resin of the invention is charged admixed with other conventional color developers for example inorganic clays of acidic or electron acceptor character e.g. attapulgus, montmorillonite, kaolin or acidic bentonite clays.

In order to achieve a stable dispersion of the color developer in the liquid medium in preparing the coating emulsion of color developer and to prepare a coating composition which will evenly coat the substrate sheet according to the invention, the metal containing novolac of the invention together with other optional conventional color developers used, is, prior to preparation of the dispersion, desirable rendered into a finely divided condition so that the average particle size of the color developer ranges from about 5 to 1 micron or less, preferably about 3 to about 1 microns and especially about 2 microns.

The rendering of the color developer into the foregoing finely divided condition can be achieved by grinding in any suitable grinding apparatus, for example a ball mill. Advantageously, the color developer is wet-ground in the presence of about half of the polar liquid medium and half of the organic surfactant used for preparing the dispersion.

In coating the color-receiving (CF) sheet, the aforementioned emulsion of color developers and adjuvant substance is evenly coated on the substrate sheet, which is preferably paper (but may also be metal foil, a plastic, etc.) by any convenient method for example by a rod or bar. The wet coated sheet is dried conveniently at ambient temperature or a moderately elevated temperature to evaporate the water or other polar liquid dispersing medium.

In preparing coating compositions on the CF sheet, the aforementioned dispersion is applied to the substrate sheet in a proportion sufficient to provide a dry coating weight of aforementioned color developers, thickness, binder and surfactant of about 5 to about 15 g., preferably about 9.5 to about 12 g. per square meter area of substrate sheet.

The technology of preparing the aforementioned coating dispersions or emulsions for CF sheets of a chemical carbonless copy sheet system or unit is more particularly described in the aforementioned U.S. Patents of Weaver and Mueller as well as R. E. Miller et al. U.S. Pat. Nos. 3,663,256 and 3,672,935 issued May 16, 1972 and June 27, 1972, respectively, the disclosures of which are incorporated herein by reference.

The colorless basic dye precursors or color bases which in micro-encapsulated form on a CB sheet are employed with the novolac resin-containing CF sheets of the invention are known colorless organic compounds which react with acidic or electron-acceptor reactants to form intensely colored products.

Typically illustrative colorless chromogenic precursors useful in the practice of the invention include for example the leuco form of Michler's hydrol and its derivatives for example, Michler's hydrol methylether as well as leuco crystal violet lactone and benzoyl leuco methylene blue. The latter two precursors together with other colorless basic dye precursors disclosed at Col. 2-3 of the aforementioned U.S. Pat. No. 3,672,935 constitute a class of precursors especially sensitive to color development on reaction with a novolac phenolic resin. Accordingly the latter class of novolac phenolic resin-sensitive colorless dye precursors is preferred in the practice of this invention.

Effective methods of microencapsulating the color precursor and the aforementioned mutual liquid solvent e.g. an alkyl biphenyl, for precursor and resin color developer, (to isolate these components from the color developer in a plurality of discrete droplets in a coating on the CB sheet) are more particularly described in the aforementioned U.S. Patents of R. E. Miller et al.

The disposition of the above-described metal modified novolac resin-containing CF sheet and the foregoing CB sheet to form a carbonless copy sheet or unit is more particularly described in the aforementioned patents of R. E. Miller et al.

The present invention provides an economical improved process for production of the metal-modified novolac phenolic resins suitable for use in copy paper systems. By charging as reactants to the preparation of the metal-modified novolac resins, low cost, readily obtainable metal oxides and free alkanoic or aromatic monocarboxylic acids, the present process avoids the necessity of charging as reactant the corresponding metal salts of alkanoic or aromatic monocarboxylic acids which salts are costly to prepare, isolate and purify.

The following examples further illustrate the various aspects of the invention but are not intended to limit it.

Various modifications can be made in the invention without departing from the spirit and scope thereof. Where not otherwise specified in this specification and claims, temperatures are given in degrees centigrade, and all parts and percentages are by weight.

EXAMPLE 1

(the following Example illustrates the preparation of a Zinc (II)-modified novolac phenolic resin employing formic acid as the acid reactant)

| Reactants | Weight Proportion-Charged: |
|---|---|
| Commercial grade p-tert.-octylphenol (PTOP) | 2250 g. |
| Phenol | 250 g. |
| Xylene | 125 g. |
| Oxalic acid (catalyst) | 19 g. |
| Water | 38 g. |
| CalSoft F (a proprietary sodium alkyl aryl sulfonate wetting agent) | 2.5 g. |
| 50% aqueous formalin (formaldehyde source) | about 0.25 g. per g. of PTOP and phenol |
| Formic acid (as 90% aqueous solution) | 122 g., (110 g. 100% basis) |
| Aqueous ammonia 26° Baume | 152 g. |
| Zinc oxide | 92.3 g. |

A novolac phenolic resin is prepared by heating a mixture of PTOP, the phenol, the xylene, the oxalic acid (as a solution in the water) and the wetting agent to about 90°–100° and gradually adding the formalin to the hot mixture over a period of one to two hours. The reaction mass is refluxed at about the aforementioned temperature until the free formaldehyde in the reaction mass is less than about 0.5%, indicating substantial completion of the condensation polymer composition. To the hot condensate is added the zinc oxide and the formic acid. The aqueous ammonia is added gradually to the reaction mass through a dropping funnel and resulting mixture is refluxed for one hour. The reaction mass is dehydrated by heating the mass gradually up to a temperature of about 150° under atmospheric pressure to remove water overhead, and is then refluxed for about 3 hours at a temperature of about 160°–170°. The molten zinc modified novolac resin is poured into a tray, solidified by being allowed to cool to ambient temperature and then ground into flakes.

There is obtained about 2700 g. of resin product which has a melting point range of 65° to 75° and an ash content of 2.9%. The percent ash content of the product corresponds to the percentage of total Zn (as ZnO) combined chemically and physically in the product, based on the weight of the product.

A portion of the product is extracted with toluene. A zinc containing residue amounting to about 1.04% by weight of the product remains after extraction, i.e. the product contains 1.04% of zinc-containing toluene insolubles. If no chelation, i.e. coordination of the zinc occurred in the reaction, the theoretical percentage of the toluene-insolubles in the product would be:

$$\frac{[\text{Charged weight of zinc oxide} + \text{charged weight of acid}] (100)}{\text{Weight of Product}} =$$

$$\frac{202.3 \text{ g. } (100)}{2700 \text{ g.}} = 7.5\%$$

The weight proportion of zinc (as percent zinc oxide based on weight of zinc oxide charged) which is incorporated into the novolac is given by the expression:

$$\frac{\text{Theoretical Percentage Toluene Insolubles} - \text{Found Percentage Toluene Insolubles}}{\text{Theoretical Percentage Toluene Insolubles}} \times 100 =$$

$$\frac{7.5 - 1.04 \ (100)}{7.5} = 86\%$$

The product contains the novolac resin, zinc, alkanoate residue, (i.e. the formate residue, —OOC—H) and either ammonia or ammonium moiety in complex coordination and has good properties which make it suitable for use as color developer for coating the record, i.e. CF, sheet of a copy paper system.

EXAMPLE 2

(the following Example illustrates the technique for preparation of a metal-modified novolac resin when the monocarboxylic acid reactant is an alkanoic acid of 2 to 12 carbon atoms at an aromatic carboxylic acid of the benzene or naphthalene series)

| Reactants | Weight Proportion-Charged (g.) |
|---|---|
| PTOP | 90 |
| Phenol | 10 |
| Oxalic Acid | 1 |
| Water | 2 |
| Calsoft F (wetting agent) | 0.1 |
| Xylene | 5 |
| 50% Aqueous Formalin | as in example 1 |
| Zinc Oxide | 3.8 |
| Benzoic Acid | 11.4 |
| Ammonia (substantially anhydrous) | 1.8 |

The PTOP, phenol oxalic acid catalyst, water, wetting agent and xylene are reacted substantially as described in Example 1 to prepare a novolac phenol resin condensate. The hot resin condensate at about 90°–100° is dehydrated by gradually raising the temperature of the resin condensate to 150°–160° while decreasing the pressure over the condensate from a pressure corresponding to 3–5 inches of mercury to about 27–29 inches of mercury. The resulting novolac phenolic resin has a melting point in the range of 66° to 89°. To the hot dehydrated novolac resin at a temperature of about 150°–170° the zinc oxide and the benzoic acid are added. Anhydrous ammonia gas is gradually added to the reaction mass through an inlet tube positioned below the surface of the molten reaction mass. On completion of the ammonia addition the reaction mass is maintained at 150°–170° for about 1 hour. The molten reaction product is discharged into a tray and allowed to cool to ambient temperature. The resultant solidified resin is then ground into particles.

There is thus obtained about 116 grams of metal-modified novolac resin product which has a melting point in the range of 66° to 89° degrees and an ash content of 3.2%. The product contains the novolac resin, zinc, carboxylate residue, (i.e. the benzoate residue, —OOCC$_6$H$_5$) and either ammonia or ammonium moiety in complex coordination. The product has excellent properties which make it highly suitable for use as color developer for coating the record sheet of a copy paper system. The toluene-insoluble fraction of the product is substantially zinc dibenzoate and amounts to about 0.1% by weight of the product, corresponding to about 96.9% zinc incorporated by the process in the product (as percent zinc oxide based on zinc oxide charged). The results of the Example are summarized in Table I below.

EXAMPLE 3 is about 10% greater than that used in Example 3, to obtain a resin which has a higher molecular weight than the product of Example 3. The product of this example is also an excellent metal-modified novolac resin suitable for use as color developer for coating a record sheet of a copy paper system. The results of this Example are also summarized in Table I below.

TABLE I

ZINC MODIFIED NOVOLAC PHENOLIC RESINS PREPARED FROM BENZOIC ACID, AMMONIA OR AMMONIUM BICARBONATE ZINC OXIDE AND NOVOLAC RESINS

| Example | Proportion of Benzoic Acid Charged Per 100 Parts of Phenolic Reactants | Proportion of Zinc Oxide Charged Per 100 Parts of Phenolic Reactant | Grams Atoms of Zinc Charged Per 100 Grams of Novolac Resin Charged | Mole Ratio of Benzoic Acid to Zinc Oxide |
|---|---|---|---|---|
| 2 | 11.4 | 3.8 | 0.040 | 2/1 |
| 3 | 11.4 | 3.8 | 0.040 | 2/1 |
| 4 | 6.64 | 3.8 | 0.040 | 1.17/1 |
| 5 | 6.64 | 6.64 | 0.069 | 0.67/1 |
| 6 | 6.64 | 3.8 | 0.040 | 1.17/1 |
| 7 | 6.64 | 6.64 | 0.069 | 0.67/1 |
| 8 | 11.4 | 3.8 | 0.040 | 2/1 |

| Examples | Ammonia Base Charged Per 100 Parts of Phenolic Reactants (g.) $NH_3$ | Ammonia Base Charged Per 100 Parts of Phenolic Reactants (g.) $NH_4HCO_3$ | Found Percentage Toluene Insolubles In Product | Percentage Ash in Product | Weight of Product Recovered (g) Per 100 g. of Phenolic Reactants | Percent Zn Incorporated Product (as Percent ZnO based on ZnO Charged) |
|---|---|---|---|---|---|---|
| 2 | 1.6 | — | 0.1% | 3.2% | 118 | 99.2% |
| 3 | — | 7.3 | 0.1% | 3.2% | 117 | 99.2% |
| 4 | 1.0 | — | 0.2% | 3.2% | 115 | 98.9% |
| 5 | 1.0 | — | 2.9% | 5.5% | 119 | 74.4% |
| 6 | — | 4.25 | 1.0% | 3.2% | 114 | 89.0% |
| 7 | — | 4.25 | 3.2% | 5.5% | 118 | 71.6% |
| 8 | — | 7.3 | 0.6% | 3.2% | 119 | 96.0% |

A novolac phenolic resin is prepared from phenol and p-tert.-octylphenol and dehydrated substantially as described in Example 2. To the hot molten novolac resin there is added zinc oxide (3.7 parts per 100 parts of the combined weight of the phenol and p-tert.-octylphenol) and benzoic acid (11.1 parts per 100 parts of the combined phenol and p-tert.-octylphenol). Solid particulate ammonium bicarbonate (7.3 parts per 100 parts of the combined phenol and p-tert.-octylphenol) is then slowly added to the molten mixture. Some foaming of the reaction mixture occurs on contact of the ammonia base with the molten reaction mixture due to evolution of carbon dioxide gas and water vapor from the ammonium bicarbonate on reaction with the other reactants. On completion of the addition of the ammonia bicarbonate, the reaction mass is agitated at 150°–170° for about 1 hour and then the product is isolated substantially as described in Example 2. There is obtained a metal-modified novolac resin substantially similar in its excellent properties to the product of Example 2. The results of this Example are summarized in the Table I below.

EXAMPLES 4–7

In Examples 4–7 the procedure employed in Example 2 is varied with respect to the selection of ammonia base and the ratio of benzoic acid charged to zinc oxide charged. The results of these Examples are also summarized in Table I below. In Examples 6 and 7 the proportion of formalin charged is about 10% greater than that in Example 2 to obtain a novolac resin which has a higher molecular weight than the resin of Example 2.

EXAMPLE 8

In this example the procedure of Example 3 is repeated substantially as described except that the novolac resin is prepared from an amount of formalin which

EXAMPLE 9

(Control)

The procedure of Example 2 is repeated substantially as described in preparing and dehydrating a novolac phenolic resin. To the hot (150°–170°) dehydrated molten novolac resin there is added zinc dibenzoate (14.1 parts per 100 parts of the phenolic reactant employed to prepare the novolac resin). To the resulting mixture ammonium bicarbonate (7.9 parts per 100 parts of the combined phenolic reactant) is slowly added. Upon completion of the ammonia base addition, the reaction mass is heated at the aforementioned elevated temperature for about one hour. The resultant metal-modified novolac resin product is recovered substantially as described in Example 2. The yield of the resin product is about 118 grams and the percentage zinc combined in the metal-modified resin product is about 97.5% (as determined on the basis of percent toluene insolubles as described in Example 1). The percent ash content of the product is about 3%. This product is reserved for comparative testing of properties in Example 10 below.

EXAMPLE 10

In the following Example the resins of Example 2 above and Example 8 above are compared in properties with a conventionally prepared zinc-modified phenolic novolac resin (the resin product of Example 9).

An emulsion is prepared by grinding 5.4 parts of the resin of Example 2 with 1.6 parts of a proprietary, carboxylic acid-type anionic surface active agent (Tamol 731; a 25% aqueous solution) and 6.2 parts of distilled water in a porcelain ball mill with 9/16 inch diameter and ¼ inch diameter stainless steel balls for a period of 21 hours.

A paper coating mass was prepared by transferring the above resin emulsion to a two-speed Waring blender and charging to the resin emulsion a solution of 0.11 parts of sodium tripolyphosphate in 74.62 parts of distilled water. Upon the addition of 66.03 parts of kaolin clay to the mixture in the blender, agitation of the mass in the blender is initiated employing the low mixing speed setting of the blender. After the mass has been agitated in the blender for about 8 minutes, 6.61 parts of starch are added and the resulting mixture is agitated for an additional 15 seconds. Then 4.63 parts of a styrene-butadiene latex are added to the mixture in the blender and agitation of the mass in the blender is continued so that the total duration of agitation of the paper coating mixture in the blender is 15 minutes.

The resulting coating mixture is applied to 8½ inch by 11 inch sheets of paper using a number 3 wire rod coater. These record sheets or coated front (CF) sheet samples are then dried in air for 24 hours at ambient temperature. The resulting dry weight of coating mixture on the paper samples is about 9.5 to 12 grams/m$^2$.

Color development properties of the aforementioned record sheets are determined employing commercially coated back (CB) or transfer copy paper sheets coated with micro-encapsulated colorless chromogenic basic dye precursor (leuco-crystal violet lactone) and mutual solvent for said precursor and the metal-containing resin.

The two sheets of paper (cut into 2⅝" by 2½" pieces) with the CB and CF sides thereof in contact are aligned with a sheet of 23 gauge perforated steel placed in back of the CB sheet, and are passed through a calendar of a 3" diameter polished steel roll and a 3" diameter rubber roll (of Shore D hardness of 55) with pressure developed by a 10 kg. weight through a set of levers having a mechanical advantage of 50. Color development is measured in a Hunter Laboratory Model D 25 color difference meter at specified intervals.

Fade resistance of the developed color is evaluated in a Weatherometer at a 140° F. These test results (reported in each instance as the average of data from 4 different sets of paper samples) are set forth in Table II below in Column A.

The foregoing testing procedure is repeated with the metal-modified resin product of Control Example 9. The evaluation test results of the latter product are set forth in Table II in Column B.

The properties of the resin of Example 8 are evaluated by the foregoing tests procedures and the results of these tests are also set forth in Table II in Column C. The latter test results are compared with an additional evaluation of corresponding properties of the resin of Control Example 9, which evaluation test results are presented in Table II in Column D.

TABLE II

COMPARATIVE EVALUATION OF PROPERTIES
OF METAL-MODIFIED NOVOLAC RESINS
(All values are Percent Reflectance values)*

| Evaluation | A | B | C | D |
|---|---|---|---|---|
| Resin of Example: | 2 | 9 (Control) | 8 | 9 (Control) |
| Paper Weight g/m$^2$ | 75.87 | 73.8 | 75.49 | 77.61 |
| Coating Weight g/m$^2$ | 9.73 | 9.67 | 10.54 | 9.04 |
| Color Development (Calendar Intensity) | | | | |
| 15 sec. | 70.9 | 70.9 | 73.3 | 70.7 |
| 120 sec. | 70.1 | 69.2 | 70.7 | 69.7 |
| 19 hours | 70.2 | 68.0 | | |
| 20 hours | | | 69.4 | |
| 23 hours | | | | 69.4 |
| Fade Resistance in Weatherometer | | | | |
| 1 hour | 75.1 | 72.6 | 70.7 | 70.5 |
| 3 hours | 77.2 | 74.7 | 72.3 | 71.6 |
| 6 hours | 79.9 | 77.6 | 75.1 | 74.2 |

The foregoing comparison of properties of products of the invention (i.e. the resins of Examples 2 and 8) with those of a corresponding product prepared by a conventional procedure of metal-modification of phenolic novolac resin (i.e. the resin of Control Example 9) indicates that the present metal-modified resins are about equal to the conventional resin in those properties which render metal-modified-novolac phenolic resins suitable for use in copy paper systems.

EXAMPLES 11–20

In these examples a novolac phenolic resin is prepared from phenol and p-tert.-octyl phenol substantially as described in Example 2.

To the hot molten novolac resin as in Example 3 there is added zinc oxide and as acid reactant various mixtures of a hydroxy benzoic acid (either salicylic acid or p-hydroxy benzoic acid) and benzoic acid or salicylic acid alone. About 3.8 g. of zinc oxide reactant per 100 g. of phenolic reactants used to prepare the phenolic resin are employed in these examples. About 0.0934 mole of acid reactant per 100 g. of the phenolic reactants are employed in the present examples.

Solid particulate ammonium bicarbonate (in a proportion of about 8.48 g. per 100 g. of the aforementioned phenolic reactants). Then charged to the molten reaction mas by a procedure substantially as described in Example 3. The resultant mixture is further treated substantially as described in Example 3 to recover zinc modified phenolic novolac resin product.

The results of these examples are summarized in Table III below.

In these examples all of the zinc-containing products obtained at a percentage of combination of zinc in accordance with the invention provide a satisfactory colored product when coated on a CF sheet and reacted with a colorless chromogenic dye precursor in a chemical carbonless copy sheet system of the type described in Example 10 above.

TABLE III

| Acids Used (mole % based on total moles of acid in acid reactant used) | EXAMPLE | | | | | | | | | |
|---|---|---|---|---|---|---|---|---|---|---|
| | 11 | 12 | 13 | 14 | 15 | 16 | 17 | 18 | 19 | 20 |
| Mole % Benzoic Acid | 90% | 70% | 50% | 30% | 10% | 0 | 0 | 90% | 80% | 70% |
| Mole % Salicylic Acid | 10% | 30% | 50% | 70% | 90% | 100% | 100% | 0 | 0 | 0 |
| Mole % p-Hydroxy Benzoic Acid | 0 | 0 | 0 | 0 | 0 | 0 | 0 | 10% | 20% | 30% |
| Yield of Product (g. per 100 g. of Phenolic Reactants) | 121.1 | 118.8 | 118.2 | 120.1 | 120.2 | 120.5 | 123.4 | 120 | 120 | 121.2 |
| Percentage Ash in Product | 3.0% | 3.1% | 3.0% | 3.1% | 3.1% | 3.1% | 3.0% | 3.1% | 3.0% | 3.0% |

TABLE III-continued

| Acids Used (mole % based on total moles of acid in acid reactant used) | EXAMPLE | | | | | | | | | |
|---|---|---|---|---|---|---|---|---|---|---|
| | 11 | 12 | 13 | 14 | 15 | 16 | 17 | 18 | 19 | 20 |
| Found Percentage of Toluene Insolubles in Product | 0.1% | 0.3% | 0.4% | 1.3% | 2.0% | 6.7% | 0.35% | 1.0% | 3.3% | 4.7% |
| Calculated Theoretical Percentage of Toluene Insolubles in Product | 12.7% | 13.2% | 13.5% | 13.5% | 13.8% | 13.8% | 13.9% | 12.7% | 12.8% | 13.2% |
| Percent Zn Incorporated in Product (as percent ZnO based on ZnO charged) | 99.2% | 97.7% | 97.0% | 90.4% | 88.8% | 51.6%* | 97.5%* | 92.1% | 74.2% | 64.1% |

*In Example 17 the ammonia base is added at about half the rate as that employed in Example 16 which employs the same acid reactant and the same proportion of ammonia base. The period of addition of ammonia base is 44 minutes and 73 minutes in Examples 16 and 17 respectively.

EXAMPLES 21-25

In these examples a novolac phenolic resin is prepared from phenol and p-tert.-octyl phenol substantially as described in Example 2.

To the hot molten novolac resin as in Example 3 there is added zinc oxide (in a proportion of 3.8 g. per 100 g. of the phenolic reactants used to prepare the phenolic resin) and an alkanoic acid (in a proportion of about 0.0934 moles of acid per 100 g. of said phenolic reactants).

As ammonia base either anhydrous ammonia (according to a procedure substantially as described in Example 2) or solid particulate ammonium bicarbonate (according to a procedure substantially as described in Example 3) is then charged to the molten reaction mass. The resultant mixture is further treated substantially as described in Example 3 to recover excellent yields of zinc modified phenolic novolac resin products. These products provide satisfactory colored products when coated on a CF sheet and reacted with colorless chromogenic dye precursor in chemical carbonless copy sheet system of the type described in Example 10.

The results of these examples are summarized in Table IV below.

TABLE IV

| Example | Alkanoic Acid Charged | Ammonia Base Charged | Wt. of Ammonia Base Charged g. per 100 g. of Phenolic Reactant | Found Percentage Toluene Insol. in Product | % Ash in Product | Calculated Theoretical Toluene Insol. in Product | Yield Product (g. per 100 g. of Phenolic Reactants) | Percent Zn Incorporated in Product (as % ZnO based on ZnO Charged) |
|---|---|---|---|---|---|---|---|---|
| 21 | Propionic Acid | anhyd. NH$_3$ | 1.6 | 0.7% | 3.3% | 10.5% | 114.8 | 93.3 |
| 22 | Isopentanoic Acid | anhyd. NH$_3$ | 1.7 | 0.2% | 3.1% | 13.1% | 117.8 | 98.4 |
| 23 | 2-Ethyl Hexanoic Acid | anhyd. NH$_3$ | 1.6 | 0.6% | 2.9% | 16.8% | 119.7 | 96.4 |
| 24 | Heptanoic Acid | ammonia bicarbonate | 8.48 | 1.0% | 3.0% | 13.3% | 120.5 | 92.7 |
| 25 | Pelargonic Acid | ammonia bicarbonate | 8.48 | 0.035% | 3.0% | 15.0% | 123.4 | 97.6 |

EXAMPLES 26-33

In these examples a novolac phenolic resin is prepared from phenol and p-tert.-octyl phenol substantially as described in Example 2.

To the hot molten novolac resin as in Example 3 there is added zinc oxide (in a proportion of about 3.8 g. per 100 g. of the phenolic reactants used to prepare the resin) and benzoic acid (in a proportion of about 11.4 g. per 100 g. of said phenolic reactants).

Alternatively, various liquid organic amines or solid particulate urea are charged slowly as the ammonia base to the molten reaction mass in a accordance with a procedure substantially as described in Example 3. The resultant mixture is further treated substantially as described in Example 3 to recover excellent yields of zinc modified phenolic novolac resin products. These products provide satisfactory colored products when coated on a CF sheet and reacted with a colorless chromogenic dye precursor in a chemical carbonless copy sheet system of the type described in Example 10 above.

The results of these examples are summartized in Table V below.

TABLE V

| Example | Ammonia Base Used | Proportion of Ammonia Base Charged (g. per 100 g. of Phenolic Reactants) | Yield of Product (g. per 100 g. of Phenolic Reactants) | Percentage Ash in Product | Found Percentage of Toluene Insolubles in Product | Percent Zn Incorporated in Product (as % ZnO based on ZnO Charged) |
|---|---|---|---|---|---|---|
| 26 | Ethylene Diamine | 2.8 | 122 | 2.9% | 0.03% | 98.8% |
| 27 | Hexamethylene Diamine | 6.0 | 125.7 | 2.9% | 0.2% | 98.3% |
| 28 | Urea | 4.2 | 122 | 3.2% | 0.3% | 97.6% |
| 29 | Mono-ethanol-Amine | 2.9 | 123 | 2.7% | 1.4% | 88.7% |
| 30 | 3-Dimethylamino-propylamine | 2.4 | 124.5 | 3.1% | 0.5% | 95.9% |
| 31 | Mono-n-butyl- | 3.4 | 123.7 | 3.0% | 0.3% | 97.6% |

TABLE V-continued

| Example | Ammonia Base Used | Proportion of Ammonia Base Charged (g. per 100 g. of Phenolic Reactants) | Yield of Product (g. per 100 g. of Phenolic Reactants) | Percentage Ash in Product | Found Percentage of Toluene Insolubles in Product | Percent Zn Incorporated in Product (as % ZnO based on ZnO Charged) |
|---|---|---|---|---|---|---|
| | amine | | | | | |
| 32 | Di-n-butyl-amine | 7.0 | 125.8 | 2.9% | 0.3% | 97.5% |
| 33 | Propylene Di-amine | 3.44 | 123.8 | 3.1% | 0.5% | 95.9% |

It will be appreciated by those skilled in the art that procedural modifications of the above-described process can be made without departing from the spirit and scope of the invention. For example, in Example 3 above the mode of addition of the acid, the zinc oxide, and the ammonium bicarbonate can be varied so that the acid, the zinc oxide and the ammonium bicarbonate are admixed at about ambient temperature and the resulting solid particulate mixture is added gradually to the hot molten phenolic novolac resin to effect the metal-modification of the resin in accordance with the invention.

The invention has been described in the above specification and illustrated by reference to specific embodiments in the illustrative examples. However, it is to be understood that these embodiments are not intended to limit the invention since, as illustrated, changes and modifications in the specific procedures disclosed hereinabove can be made without departing from the scope or spirit of the invention.

What is claimed is:

1. In the process of preparing a metal-modified novolac phenolic resin wherein the metal is selected from the group consisting of copper, aluminum, zinc, chromium, indium, tin, cadmium, cobalt and nickel, by reaction of a compound of said metal, an ammonia base and a novolac phenolic resin at an elevated temperature sufficient to maintain the reaction mixture in molten condition, the improvement comprising charging as reactants an oxide of the metal or the functional equivalent of said oxide, a mono-carboxylic acid selected from the group consisting of $C_{1-12}$ alkanoic acids and aromatic carboxylic acids of the benzene or naphthalene series, an ammonia base and the novolac phenolic resin.

2. The process of claim 1 wherein the metal oxide or its functional equivalent is charged in a proportion to provide about 0.01 n to about n gram atoms of the metal per 100 parts by weight of the resin, where n is an integer denoting the positive oxidation state of the metal in the metal oxide or its functional equivalent, the proportion of the acid is about 0.1 to about 3 moles per gram-atom of metal employed, the ammonia base is charged in a proportion which corresponds to from about 0.5 equivalent to about 3 equivalents of $NH_3$ per mole of acid employed and the metal of the metal oxide is in the positive oxidation state of two.

3. The process of claim 2 wherein the metal of the metal oxide or its functional equivalent is zinc, and the ammonia base is added gradually to the mixture of resin, acid, and metal oxide or its functional equivalent at a temperature of about 90° to about 180° C.

4. The process of claim 3 wherein the metal oxide or its functional equivalent is employed in a proportion to provide about 0.02 n to about 0.5 n gram-atoms of the metal, per 100 parts by weight of the resin, the acid is employed in a proportion of about 0.2 to about 2.5 moles per gram-atom of metal employed and the ammonia base is charged in a proportion which corresponds to about 1.0 to about 1.5 equivalents of $NH_3$ based on the molar proportion of acid used.

5. The process of claim 4 wherein preparation of the phenolic novolac resin is carried out by condensation of a mixture comprising a phenol and an aldehyde source followed by dehydration of the condensation reaction mass, and the metal oxide or its functional equivalent, the acid and the ammonia base are admixed with the resin subsequent to the condensation reaction to react the metal into the resin prior to, during or subsequent to dehydration of the resin.

6. The process of claim 5 wherein the reaction of the acid, ammonia base, resin and metal oxide or its functional equivalent is carried out under an inert atmosphere and the phenolic reactant is selected from the group consisting of para-substituted difunctional phenols, trifunctional phenols and mixtures thereof.

7. The process of claim 6 wherein the phenol reactant comprises a mixture of about 80 to about 100 weight percent of a difunctional para-substituted phenol and about 0 to about 20 weight percent of a trifunctional phenol.

8. The process of claim 7 wherein the ammonia base is an inorganic compound, the aldehyde source is a formaldehyde source, the difunctional para-substituted phenol is p-tertiary octyl phenol, and the trifunctional phenol is phenol.

9. The process of claim 8 wherein the formaldehyde source is formaldehyde or formalin and the metal oxide or its functional equivalent is ZnO.

10. The process of claim 9 wherein the acid reactant is a low melting acid of melting point below about 200° C. or mixture of said low melting acid with a high melting acid having a melting point in the range of about 200° C. to about 400° C., the proportion of said low melting acid in said mixture being about 1 to about 99 mole percent based on the moles of acid in said mixture.

11. The process of claim 10 wherein the acid is a mixture of the low melting acid and the high melting acid.

12. The process of claim 11 wherein the proportion of low melting acid in said mixture is about 10 to 90 mole percent.

13. The process of claim 12 wherein the proportion of low melting acid in said mixture is about 70 to 90 mole percent.

14. The process of claim 13 wherein the low melting acid and the high melting acid are independently selected from alkanoic acids of 2 to 8 carbon atoms and carboxylic acids of the benzene series.

15. The process of claim 14 wherein the low melting acid and the high melting acid are monocarboxylic aromatic acids of the benzene series.

16. The process of claim 10 wherein the acid reactant consists of the low melting acid.

17. The process of claim 16 wherein the acid is formic acid.

18. The process of claim 17 wherein the formic acid, the ammonia base, the metal oxide, and the resin are admixed subsequent to the condensation of the resin and prior to dehydration of the resin at a temperature of about 90° to about 110° C.

19. The process of claim 16 wherein the acid is a hydrocarbon alkanoic acid.

20. The process of claim 19 wherein the acid is pelargonic acid.

21. The process of claim 19 wherein the acid is of 2 to 8 carbon atoms.

22. The process of claim 21 wherein the acid is propionic acid.

23. The process of claim 21 wherein the acid is iso-pentanoic acid.

24. The process of claim 21 wherein the acid is 2-ethyl hexanoic acid.

25. The process of claim 21 wherein the acid is heptanoic acid.

26. The process of claim 16 wherein the acid is an aromatic carboxylic acid of the benzene series.

27. The process of claim 26 wherein the acid is salicylic acid.

28. The process of claim 26 wherein the acid is a hydrocarbon carboxylic acid.

29. The process of claim 28 wherein the acid is benzoic acid.

30. The process of claim 9 wherein the ammonia base, the metal oxide, the acid and the resin are admixed during or subsequent to dehydration of the resin at a temperature of above about 130° C.

31. The process of claim 9 wherein the ammonia base is an inorganically substituted ammonia base.

32. The process of claim 31 wherein the ammonia base is substantially anhydrous ammonia.

33. The process of claim 31 wherein the ammonia base is ammonium carbonate.

34. The process of claim 31 wherein the ammonia base is ammonium bicarbonate.

35. The process of claim 9 wherein the ammonia base is an organically substituted ammonia base.

36. The process of claim 35 wherein the ammonia base is urea.

37. The process of claim 35 wherein the ammonia base is a lower organic amine containing a primary amino group.

38. The process of claim 37 wherein the amine is monoethanol amine.

39. The process of claim 37 wherein the amine is a hydrocarbon amine selected from the group consisting of mono-n-butyl amine, ethylene diamine, propylene diamine, 3-dimethyl-amino-propyamine and hexamethylene diamine.

40. The process of claim 35 wherein the ammonia base is a lower organic amine containing a secondary amino group.

41. The process of claim 40 wherein the amine is di-n-butylamine.

42. In the process of preparing a zinc-modified novolac phenolic resin by reaction of a zinc compound, an ammonia base and a novolac phenolic resin at an elevated temperature sufficient to maintain the reaction mixture in molten condition, the improvement comprising charging as reactants zinc oxide or zinc carbonate, benzoic acid or formic acid, an ammonia base, and a novolac phenolic resin.

43. The process of claim 42 wherein the zinc compound is zinc oxide and the acid is benzoic acid.

* * * * *